United States Patent [19]

Olschewski et al.

[11] 4,233,855
[45] Nov. 18, 1980

[54] MECHANISM FOR THE AXIAL SHIFTING OF AN ANTI-FRICTION BEARING

[75] Inventors: Armin Olschewski; Heinrich Kunkel, both of Schweinfurt; Manfred Brandenstein, Aschfeld; Lothar Walter, Schweinfurt, all of Fed. Rep. of Germany

[73] Assignee: SKF Kugellagerfabriken GmbH, Schweinfurt, Fed. Rep. of Germany

[21] Appl. No.: 909,654

[22] Filed: May 25, 1978

[30] Foreign Application Priority Data

Jun. 10, 1977 [DE] Fed. Rep. of Germany ....... 2726080

[51] Int. Cl.³ ............................................. F16H 35/06
[52] U.S. Cl. ........................................ 74/396; 74/424; 308/189 R; 308/207 R
[58] Field of Search ............ 308/236, 174, 233, 189 R, 308/189 A, 207 A, 207 R, 216, 31, 197; 74/395, 396, 409, 424; 403/370, 371

[56] References Cited

U.S. PATENT DOCUMENTS

| 1,631,557 | 6/1927 | Sponable | 308/207 R |
|---|---|---|---|
| 1,703,218 | 2/1929 | Wegner | 74/396 |
| 1,708,710 | 4/1929 | Vincent | 74/424 |
| 1,956,237 | 4/1934 | Hughes | 74/424 |
| 2,022,290 | 11/1935 | Large | 308/189 R |
| 2,227,697 | 1/1941 | Blood | 308/189 R |
| 2,230,899 | 2/1941 | McGrath | 74/396 |
| 2,650,867 | 9/1953 | Spieth | 403/370 |
| 2,924,424 | 2/1960 | Titterington | 308/189 R |
| 3,019,067 | 1/1962 | Schnell | 308/189 R |
| 3,361,460 | 1/1968 | Jansen | 403/370 |

FOREIGN PATENT DOCUMENTS

| 68711 | 5/1915 | Austria | 308/236 |
|---|---|---|---|
| 1575734 | 2/1970 | Fed. Rep. of Germany | 308/174 |

*Primary Examiner*—Allan D. Herrmann
*Attorney, Agent, or Firm*—Eugene E. Renz, Jr.

[57] ABSTRACT

Mechanism for axially shifting an anti-friction bearing mounted in a bore of a housing extension or the like. The mechanism comprises an annular member such as the outer ring of the bearing mounted in the bore which has at least one radially outwardly directed protrusion engaging through an axial slit in the housing extension. The extension has external screw threads adjacent the axial slits to receive locking nuts on either side of the protrusion to fix the annular member in a selected position relative to the extension.

6 Claims, 4 Drawing Figures

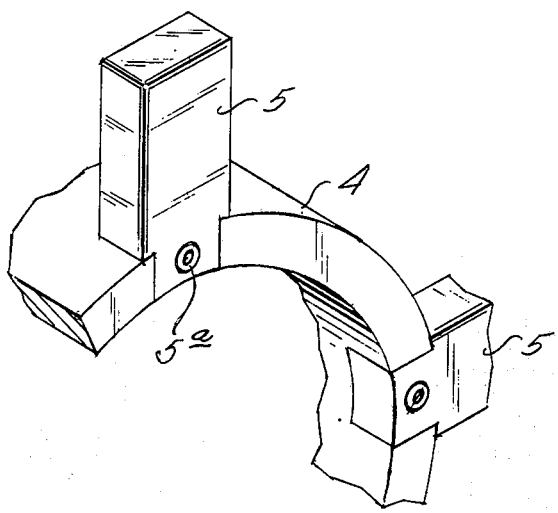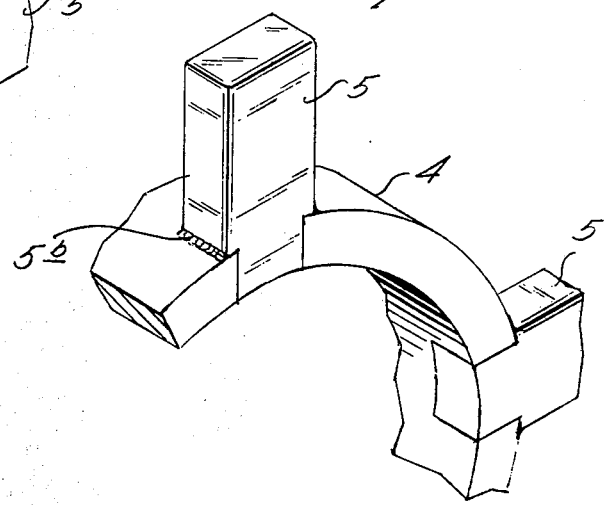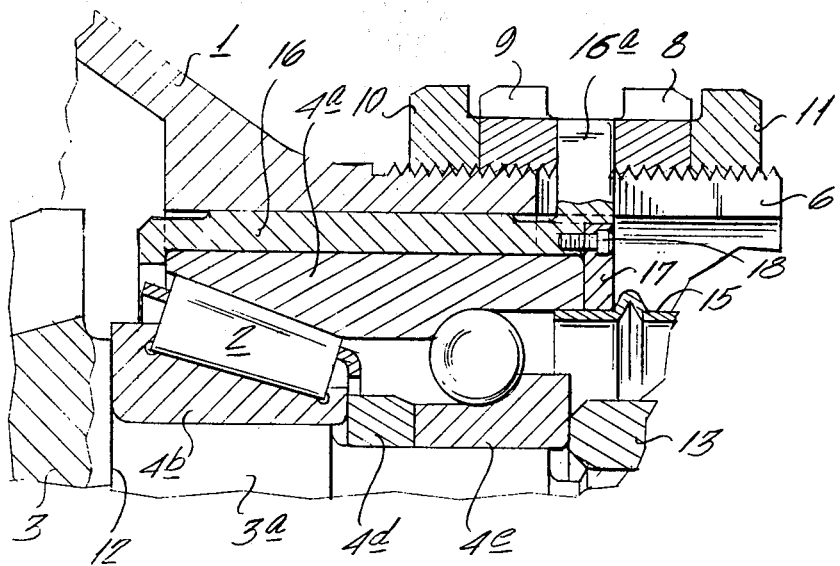

MECHANISM FOR THE AXIAL SHIFTING OF AN ANTI-FRICTION BEARING

BACKGROUND OF THE INVENTION

The present invention relates to apparatus or mechanism for axially actuating or shifting an anti-friction bearing mounted directly or with a sleeve as an intermediate connection in the bore of housing extension or the like by means of screw elements engaging with the extended housing section.

In some bearing assemblies, it is necessary and desirable to adjust precisely in an axial direction, the machine part which is engaged through an anti-friction bearing. An example of this type of arrangement is a pinion gear arrangement particularly bevel gears, which must be set very precisely so that the teeth of the gears mesh accurately. As a rule this adjustment is accomplished by adding spacers in the form of thin plates or washers and generally the assembly of these spacers is a somewhat time consuming process.

It is also known in the prior art to provide a mechanism or apparatus wherein the bearings for the pinion are mounted in a sleeve or the like which is provided with a flange and whereby the axial shifting of the bearing and thus the axial adjustment of the pinion is achieved by means of the combined effect of attachment and forcing screw members. An example of this type of mechanism is shown in German Patent as DT-AS No. 1 000 654. Axial adjustment may also be achieved by the use of threaded adjustment rings and an arrangement of this type is shown in German Patent DT-PS No. 391 270. These prior known designs have certain disadvantages and drawbacks. For example, the adjusting means comprising a multiplicity of screws along the periphery are usually located in a part which is not very accessible. Accordingly, since they have to be reset from time to time it is a tedious and time-consuming process to disassemble parts of the mechanism to gain access to the adjusting screws. Furthermore, in these assemblies, inaccuracies which do not assure an exact adjustment can result by reason of distortions and the compounding effect of the tolerances of the individual parts.

In other known mechanisms, the outer surface of the sleeve in which the bearings sit or both ends of the outer ring of the bearing itself are provided with threaded segments for receiving grooved nuts located on both sides of a housing flange or the like. Arrangements of this type are shown in German Patent DT-PS No. 924 789 and DT-Gbm No. 1 956 130. These designs also have certain shortcomings since it has been found that it is possible only with extreme difficulty and with the use of complicated tools to gain access to the adjusting nuts on both sides of flange. Accordingly, this process is usually carried out with an open housing. Beyond this, there is no problem-free means for securing the outer ring of the bearing against twisting in these prior known designs.

With the foregoing in mind, an object of the present invention is to provide a mechanism wherein the axial shifting takes place exteriorly of the mechanism and wherein the adjustment does not involve the use of complicated tools. The present invention is also characterized by novel features of construction and arrangement whereby the twisting of the outer ring of the bearing or the mounting sleeve is avoided.

SUMMARY OF THE INVENTION

In accordance with another object of the invention, the anti-friction bearing or the sleeve which takes up the anti-friction bearing is provided with several radially outwardly oriented protrusions which are distributed along the circumference and the housing extension is provided along part of its length with corresponding axially extending slits through which the protrusions project and thereby extend to the outside. By this arrangement the outer surface of the housing extension has at least one thread in the area of the slits and the nuts are superimposed upon the thread on both sides of the protrusions.

In accordance with another important feature of the present invention, protrusions may be designed so that they are of one-piece construction with the outer ring of the bearing or as an alternative with the sleeve taking up the bearing. The protrusions can also be separate elements having locating pins or the like which are subsequently connected to the outer ring of the bearing or directly with the sleeve taking up the bearing.

By reason of the novel construction of the adjusting mechanism in accordance with the present invention, it is possible to axially shift the bearing in a relatively simple manner from the outside by just adjusting the nuts onto the housing extension. This type of adjustment is also possible in the assembled state without having to open the gear box. By this arrangement it is therefore possible in certain cases to compensate for geometric changes in the mating machine parts resulting from wear or other factors. This construction also results in a bracing means against twisting by a relatively simple arrangement, that is the protrusions which extend through slits in the housing extension.

BRIEF DESCRIPTION OF THE DRAWING

These and other objects of the present invention are the various features and details of the operation and construction thereof are hereinafter more fully set forth with reference to the accompanying drawing wherein:

FIGS. 2 and 3 are perspective views showing modifications of the present invention; and FIG. 4 is an enlarged fragmentary transverse sectional view showing still another modification in accordance with the present invention.

BRIEF DESCRIPTION OF THE PREFERRED EMBODIMENT

Figure 1:
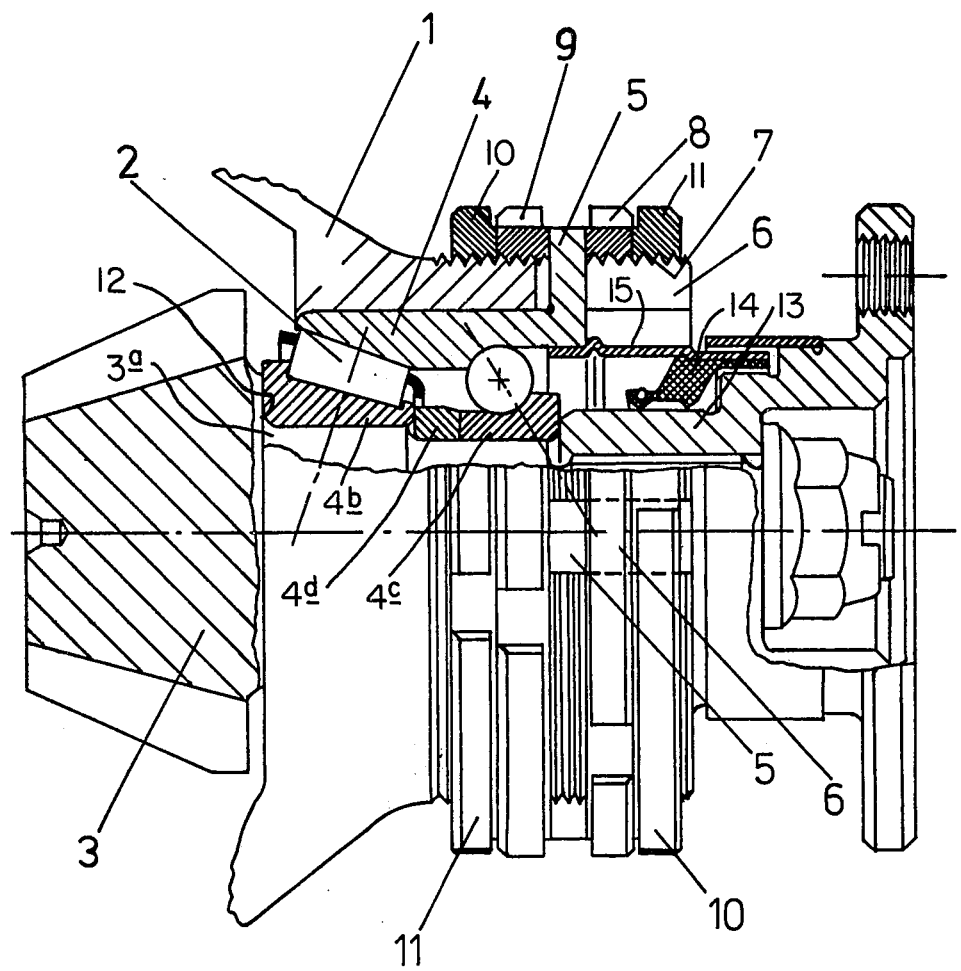
FIG. 1 is a side elevational view partly in section of an adjusting mechanism in accordance with the present invention.

Considering now the drawing, there is illustrated an assembly incorporating an adjusting mechanism in accordance with the present invention. As illustrated the drive pinion 3 of a rear axle gear unit is supported in a housing extension 1 by means of an anti-friction bearing assembly 2. The bearing illustrated is a combination tapered roller-angular contact ball bearing having a common outer ring 4 the inner periphery of which is shaped to define the outer raceway for the complement of tapered rollers and the balls. The bearings having separate inner rings 4b and 4c and a spacer 4d between the rings. The inner ring 4b for the tapered roller bearing abuts a shoulder 12 at the juncture of the pinion 3 and shaft 3a.

The inner rings are supported against the shoulder by a collar 13 which abuts the outer axial end face of the inner ring 4c for the ball bearing assembly. As illustrated a suitable seal 14 supported on a sleeve 15 engages the collar to shield the bearings against ingress of foreign matter.

The outer ring 4 as illustrated is provided with radially outwardly directed, circumferentially spaced protrusions 5 which extend through corresponding longitudinal slits 6 in the housing extension. The housing extension has formed on its outer surface a thread 7 to receive adjusting nuts 8 and 9 on either side of the protrusions 5. By this construction, the nuts may be selectively actuated along the threads 7 which in turn axially shifts the radial protrusions 5 in the slits 6 and in turn effects a corresponding axial shifting of the bearing and the pinion supported therein. In order to preclude undesirable loosening of the adjusting nuts 8 and 9 and a corresponding axial shift of the bearing, supplemental lock nuts 10, 11 are provided which are disposed on adjacent opposite axial ends of the adjusting nuts 8 and 9 in the manner illustrated. In lieu of the lock nuts, the adjusting nuts 8 and 9 may be provided with locking plates to achieve the same effect.

In the embodiment illustrated, the radial protrusions are formed integrally with the outer ring of the bearing. It is noted, however, that it is possible to form these protrusions separately in the manner illustrated in FIGS. 2 and 3 and to subsequently secure them to the outer ring of the bearing by suitable fastening means. For example the protrusion can be secured by a screw connection 5a as illustrated in FIG. 2. It is also possible to attach the protrusions to the outer ring of the bearing by soldering or welding, e.g. ultrasonic welding as indicated at 5b in FIG. 3.

Considering now the arrangement described above for effecting axial adjusting of the bearing and pinion, it is readily apparent that the adjustment of the pinion can be accomplished in a simple fashion. For example, the lock nut 10 and adjusting nut 8 on the outboard side of the radial projections 5 may simply be loosened and the lock nut and the adjusting nut 9 and its lock nut 11 on the inboard side of the protrusions 5 are correspondingly tightened. By this action the protrusions 5 and therewith the bearings and also the pinion are axially shifted. It is readily apparent that this adjustment therefore can be undertaken in a simple fashion without opening the gear box. The exact position of the parts with respect to one another can accordingly be adjusted at any time.

Even though a particular embodiment of the present invention has been illustrated and described herein it is not intended to limit the invention and changes and modifications within the scope of the following claims are within the teaching of the invention. For example, the bearings may be mounted in a sleeve 16 which is in turn equipped with radial protrusions 16a which penetrate through the longitudinal slits in the housing extension sleeve 16 may have a separable flange 17 at one end held in place by screws 18 for purposes of mounting it to the bearing. The invention is also not restricted to applications such as pinions of rear axle gear units but rather it can be applied in all applications where the bearing for any reason has to be set or adjusted very precisely in an axial direction.

We claim:

1. Mechanism for axially shifting an anti-friction bearing mounted in a bore of a housing extension (1) or the like comprising an annular member (4) mounted in said bore, at least one radially outwardly directed protrusion (5) connected to said annular member projecting through an axially extending slit (6) in said extension (1), the outer peripheral surface of said extension being provided with threads (7) adjacent said slit and two adjusting locking nuts (8, 9) engageable on said thread (7) on opposite sides of said protrusion (5) thereby permitting axial adjustment of said annular member in either axial direction and locking said annular member in a predetermined position against axial displacement in either direction.

2. A mechanism as claimed in claim 1 including a plurality of circumferentially spaced protrusions and a plurality of slits in said extension corresponding in number to said protrusions and circumferentially spaced at predetermined angular distance to receive the protrusions of said annular member.

3. A mechanism as claimed in claim 1 wherein said annular member comprises the outer ring of the bearing and said protrusions are formed integrally with said outer ring.

4. A mechanism as claimed in claim 1 wherein said protrusions are formed by pins or the like which are suitably connected to the annular member by fastening means.

5. A mechanism as claimed in claim 4 wherein the pins are connected to the outer ring of the bearing by soldering or welding.

6. A mechanism as claimed in claim 1 including a pinion gear assembly mounted in said extension and wherein said bearing comprises a combined tapered roller and angular contact ball bearing supported on the shaft of said pinion gear.

* * * * *